(12) United States Patent
Emelko (10) Patent No.: US 8,693,683 B2
(45) Date of Patent: Apr. 8, 2014

(54) CRYPTOGRAPHICALLY SECURE AUTHENTICATION DEVICE, SYSTEM AND METHOD

(75) Inventor: Glenn A. Emelko, Mentor, OH (US)

(73) Assignee: Aclara Technologies LLC, St. Louis, MO (US)

(*) Notice: Subject to any disclaimer, the term of this patent is extended or adjusted under 35 U.S.C. 154(b) by 21 days.

(21) Appl. No.: 13/512,095

(22) PCT Filed: Nov. 17, 2010

(86) PCT No.: PCT/US2010/057054
§ 371 (c)(1),
(2), (4) Date: May 25, 2012

(87) PCT Pub. No.: WO2011/066152
PCT Pub. Date: Jun. 3, 2011

(65) Prior Publication Data
US 2012/0275595 A1 Nov. 1, 2012

Related U.S. Application Data

(60) Provisional application No. 61/264,312, filed on Nov. 25, 2009.

(51) Int. Cl.
*G06F 21/00* (2013.01)
(52) U.S. Cl.
CPC ............... *H01L 9/08* (2013.01); *H01L 9/3281* (2013.01); *H01L 9/3223* (2013.01)
USPC .................................. 380/44; 713/169; 726/4
(58) Field of Classification Search
CPC ........... H04L 9/3281; H04L 9/08; H04L 9/30; H04L 63/08
See application file for complete search history.

(56) References Cited

U.S. PATENT DOCUMENTS

| | | | |
|---|---|---|---|
| 5,189,700 | A | 2/1993 | Blandford |
| 2001/0002929 | A1 | 6/2001 | Mache |
| 2002/0007453 | A1 | 1/2002 | Nemovicher |
| 2002/0018561 | A1 | 2/2002 | Emelko |
| 2002/0023220 | A1 | 2/2002 | Kaplan |
| 2002/0129159 | A1 | 9/2002 | Luby et al. |
| 2005/0091443 | A1 | 4/2005 | Hershkovich et al. |
| 2006/0059194 | A1 | 3/2006 | Oh et al. |
| 2007/0233891 | A1 | 10/2007 | Luby et al. |
| 2007/0266118 | A1 | 11/2007 | Wilkins |

(Continued)

OTHER PUBLICATIONS

Luk, Mark et al., Seven Cardinal Properties of Sensor Network Broadcast Authentication, SASN, Oct. 30, 2006, Alexandria, Virginia, USA, 10 pages.

(Continued)

*Primary Examiner* — Fikremariam A Yalew
(74) *Attorney, Agent, or Firm* — Senniger Powers LLP (57) ABSTRACT

An electronic device generates identifying values which are used in authenticating the electronic device. The device comprises an interface, a private key generator for generating a private key, a non-volatile memory for storing at least the private key, an index source, a hash engine, and a logical interconnection between the private key generator, the non-volatile memory, the index source, the hash engine and the interface. The hash engine generates identifying values provided to the interface via the logical interconnection. The identifying values are provided to a verifying device for use in authenticating the electronic device. Alternatively or in addition, devices may be paired to share a root key to cryptographically communicate between each other and/or to authenticate each other.

21 Claims, 8 Drawing Sheets

(56) References Cited

U.S. PATENT DOCUMENTS

2008/0189543 A1\* 8/2008 Parkinson .................... 713/156
2008/0298587 A1 12/2008 Luk et al.
2010/0042842 A1\* 2/2010 Huang et al. ................. 713/176

OTHER PUBLICATIONS

Perrig, Adrian et al., Efficient Authentication and Signing of Multicast Streams over Lossy Channels, 1999, IBM T.J. Watson Research Lab, 18 pages.

Perrig, Adrian et al., Efficient and Secure Source Authentication for Multicast, Proceedings of the Internet Society Network and Distributed System Security Symposium (NDSS 2001), Feb. 2001, pp. 35-46.

Perrig, A. et al., In Secure Broadcast Communication in Wired and Wireless Networks, Springer (Kluwer), 2003, pp. 1-17.

Perrig, Adrian et al., The TESLA Broadcast Authentication Protocol, Research conducted at UC Berkeley and IBM Research, Date Unknown, 11 pages.

\* cited by examiner

CRYPTOGRAPHICALLY SECURE AUTHENTICATION DEVICE, SYSTEM AND METHOD

BACKGROUND

The present invention generally relates to a system and method for providing secure authentication of a device, and more particularly, but not exclusively, to providing an authentication system utilizing internal keying of devices, such that private keys are only stored internal to each device.

Small, low-power, wireless devices are used in many industrial and civilian application areas, including industrial process monitoring and control, machine health monitoring, environment and habitat monitoring, healthcare applications, building automation, utility monitoring and control, and traffic control. The wireless devices may communicate with one another and/or with a central server. Since the wireless devices may have the ability to perform critical functions, such as controlling traffic signals, controlling electricity and gas usage or controlling entry into a building, it is important that the security of the wireless devices not be compromised. Often wireless devices use cryptographic keys for data encryption and/or authentication. For example, wireless devices may use a symmetric key 128-bit advanced encryption standard for data encryption and/or frame integrity to protect data from being modified by parties without cryptographic keys. At the time of manufacture, producers may use public-key cryptography to embed, or inject, a private key that uniquely identifies a device. The private key may be used for authentication of the device. However, when producers use third-party manufacturers there could be a threat of key leakage, where not all of the keying material is used to manufacture legitimate devices. In this instance an illegitimate device may be embedded with a private key which may allow the illegitimate device unauthorized access to the wireless devices.

Furthermore, the private keys embedded into the devices are generated and stored external to the devices, such as in a database or a removable medium. If a third party were to obtain access to the database storing the embedded keys, the third party may be able to gain unauthorized access to one or more of the wireless devices. Instead of having to search through all possible 128-bit keys to obtain access to the devices, the search space of possible keys would be narrowed to the keys stored on the data store. Thus, the security of the wireless devices may rely on the security of the external data store where the set of keys are stored. Compromising the security of the data store may result in compromising the security of the wireless devices having keys stored therein.

SUMMARY

An electronic device generates identifying values based on a random number generated by an on-board random number generator and the difference between an index number and a reference number. The identifying values are used by a verifying device in authenticating the electronic device without releasing the random number.

Other objects and features will be in part apparent and in part pointed out hereinafter.

BRIEF DESCRIPTION OF THE DRAWINGS

Corresponding reference characters indicate corresponding parts throughout the drawings.

DESCRIPTION

In the disclosed embodiments, a secure authentication device, system and method are presented which internally generate and store a private key. The private key is used to generate a unique identifying value (I.V.) for the device. The private key is not accessible other devices, thereby preventing the private key from potentially being accessed by a third party. The secure authentication device utilizes an authentication method in which the device can demonstrate it possesses the private key without disclosing the private key. Thus, authentication is accomplished without the device having to communicate the private key externally. Since the private key is only stored internally on the device, such as in memory of the device, and is never communicated externally to the device, it is very difficult for a third party to compromise the security of the device.

Figure 1:
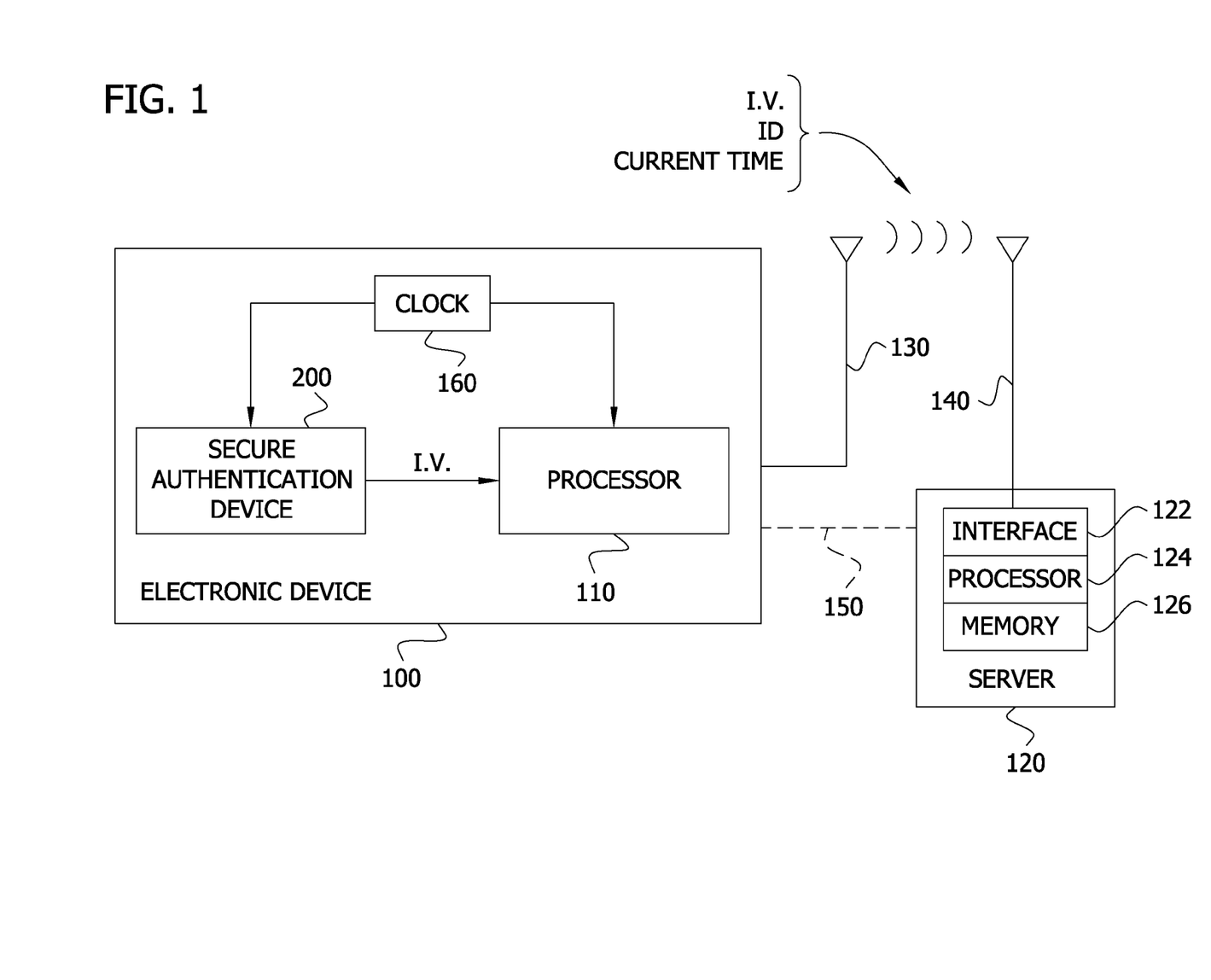
FIG. 1 is a block diagram of an exemplary system including a secure authentication device in accordance with one embodiment of the invention.

Turning now to the drawings, FIG. 1 provides a block diagram of an electronic device 100 including a secure authentication device 200 in accordance with one embodiment and including a processor 110. The secure authentication device 200 may provide one or more identifying values to the processor 110 for transmission to a verifying device such as a server 120 or other station, device or system which needs to verify the unique identity of the electronic device 100. The secure authentication device 200 may be implemented in a microchip, on a system board, or generally through any device capable of interfacing with the processor 110. The electronic device transmits an identifying value (I.V.), an identification of the electronic device 100 and a current time, all of which is received by the server 120 for use in verifying that the electronic device 100 is authentic. In the embodiment illustrated in FIG. 1, the information may be transmitted by a wireless transmission, such as via antennas 130, 140, and/or via some other wireless transmission (such as an infrared transmission), and/or via a wired connection 150 (such as a wired network).

The electronic device 100 may be any device which requires authentication. For example, the electronic device 100 may be a meter reading device used in a remote meter reading system, in which case the processor 110 may communicate with a sever and transmits information to the server regarding the meter reading. In this example, the meter reading device may need to authenticate with a billing server to verify the values provided by the meter reading device. Alternatively, the electronic device 100 may be a mobile phone which authenticates with a mobile phone network using an international mobile equipment identifier (IMEI). Thus, the processor 110 would be a mobile phone processor for operating the mobile phone and transmitting information, including voice information. Alternatively, the electronic device 100 may be wireless sensor which operates in a wireless network requiring authentication.

In one embodiment, one or more of a plurality of the electronic devices 100 may be paired with a server 120 when the electronic device 100 is manufactured. Each secure authentication device 200 has its own private key generator on board and generates its own private key. In addition, each device 200 may identify (or is assigned) an end date/time in the future to associate with its private key. The identified end date/time should be sufficiently far enough in the future so as to outlast the life expectancy of the device, such as a date/time fifty years into the future. The secure authentication device 200 stores the private key and the identified end date/time internally, such as in a non-volatile memory.

Figure 4A:
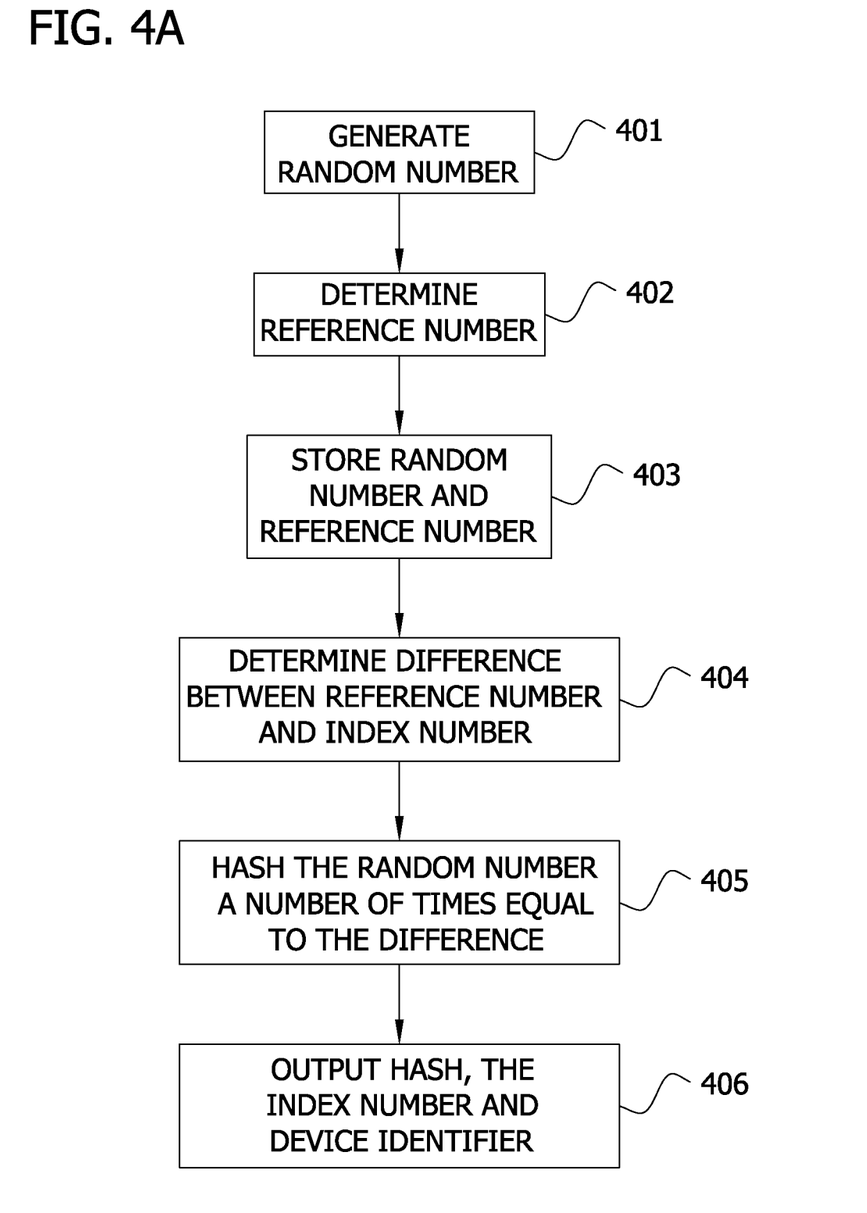
FIGS. 4A and 4B are flowcharts illustrating an internal keying operation of the secure authentication device of FIG. 2, or other secure authentication device in accordance with embodiments of the invention.
Figure 4B:
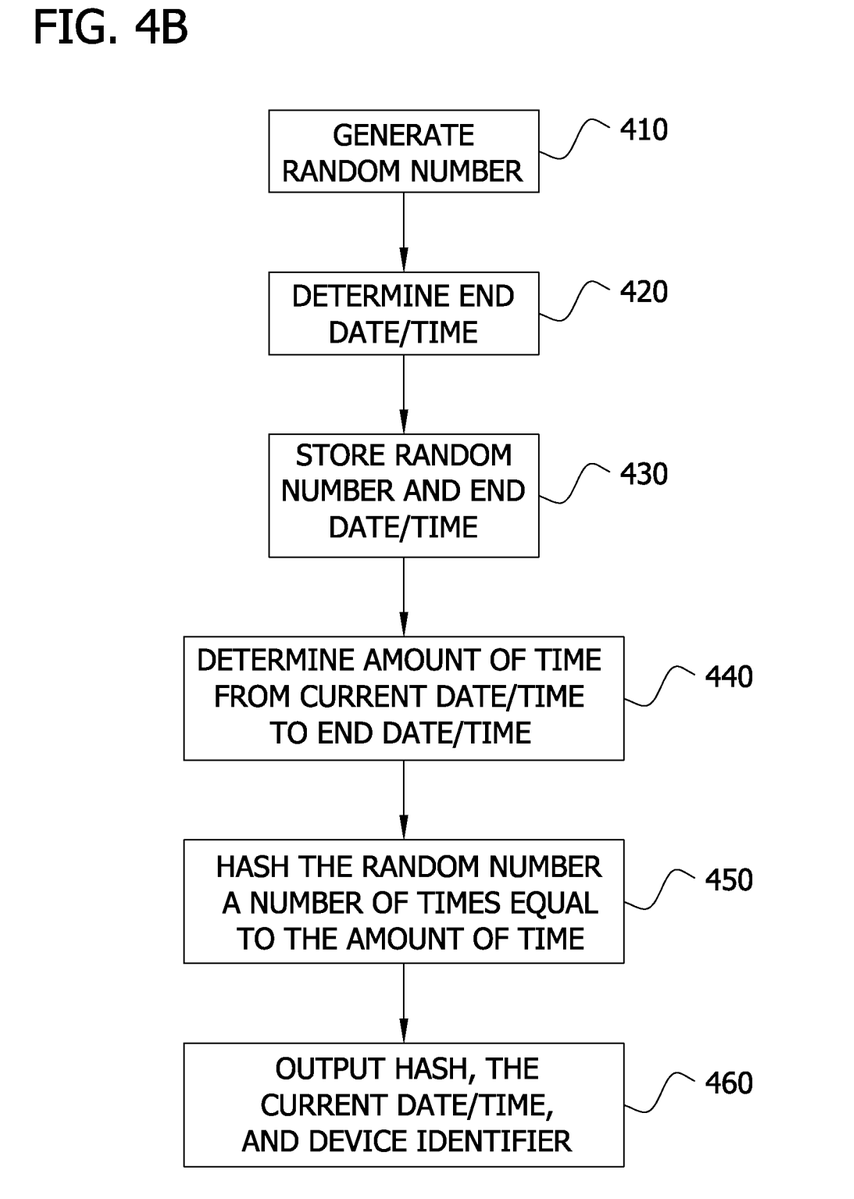

In operation, each secure authentication device 200 determines an amount of time between the current date/time and the end date/time. The amount of time can be measured in any unit, such as seconds, milliseconds, minutes, etc. Each secure authentication device 200 performs a number of hashes on the private key derived from the amount of time and provides the resulting hash (i.e., a first identifying value) to the processor 110. The number of hashes may be the difference, a linear value derived from the difference or some other value based in whole or in part on the difference. The processor 110 transmits the following information to the server 120: the first identifying value, the current date/time provided by a clock 160, and an identifier (an "ID") of the electronic device 100, such as an IMEI of a mobile phone. The server 120 includes an interface 122 for receiving the transmitted information and a processor 124 operatively connected to the interface 122 and a memory 126, such as in a data store. The processor stores in the memory 126 the identifier of the electronic device 100, the first identifying value, and the current date/time. However, the secure authentication device 200 never provides the private key to the server 120. Thus, the private key is not transmitted so that the private key cannot be obtained by a third party by receiving the transmitted information or by accessing the server 120. As a result, the security of the device 100 and the server 120 are not compromised. The initial keying operations of the secure authentication device are discussed in more detail in FIG. 4 below.

The server 120 can authenticate each electronic device 100, or the electronic device 100 can initiate authentication with the server at a later time (referred to as a "later current date/time"). During authentication, each secure authentication device 200 determines the later current date/time and determines the amount of time (e.g., seconds) between the later current date/time and the end date/time stored on the secure authentication device 200. The secure authentication device 200 hashes the private key based on the amount of time (e.g., the hashes may be a number of times derived from the number of seconds between the later current date/time and the end date/time) to generate a second identifying value. The secure authentication device 200 provides the second identifying value to the processor 110 which provides the second identifying value to the server 120, along with the device identifier and the later current date/time. The server 120 determines the amount of time (e.g., the number of seconds) between the later current date/time received from the secure authentication device 200 and the prior date/time last received when the electronic device 100 was authenticated (e.g., the immediately previous current date/time of the first identifying value). If the electronic device 100 was not previously authenticated, this prior date/time would be the date/time when the electronic device 100 was first paired with the server. The server 120 determines the amount of time (e.g., the difference in number of seconds) between the later current date/time and the prior dates/times and hashes the received second identifying value a number of times derived from the amount of time (e.g., the number of seconds). The resulting second identifying value should be equal to the previous (first) identifying value received from the secure authentication device 200 of device 100. In particular, if the resulting value is equal to the previous (first) identifying value received from the secure authentication device 200 of device 100, then the authentication is confirmed. Otherwise, if the resulting value is not equal to the previous (first) identifying value received from the secure authentication device 200 of device 100, then the authentication fails and the device is not authenticated. The operations of verifying or authenticating a secure authentication device 200 are discussed in more detail in FIGS. 4-5 below.

Since the private key is only stored within the secure authentication device 200, only the secure authentication device 200 could perform a number of hashes on the private key derived from an amount of time between the end date/time and the later current date/time, and provide the result to the server 120. The server then continues to hash the identifying value a number of times derived from the amount of time (e.g., the number of seconds) since the prior identifying value was received from the secure authentication device 200. If a strong hash function is used, such as a Secure Hash Algorithm-256 (SHA-256), it may be very difficult for a third party to reverse the hash the number of times to identify the private key. Thus, it may be very difficult for a third party to determine the private key based on the identifying values provided by the secure authentication device 200.

Figure 2:
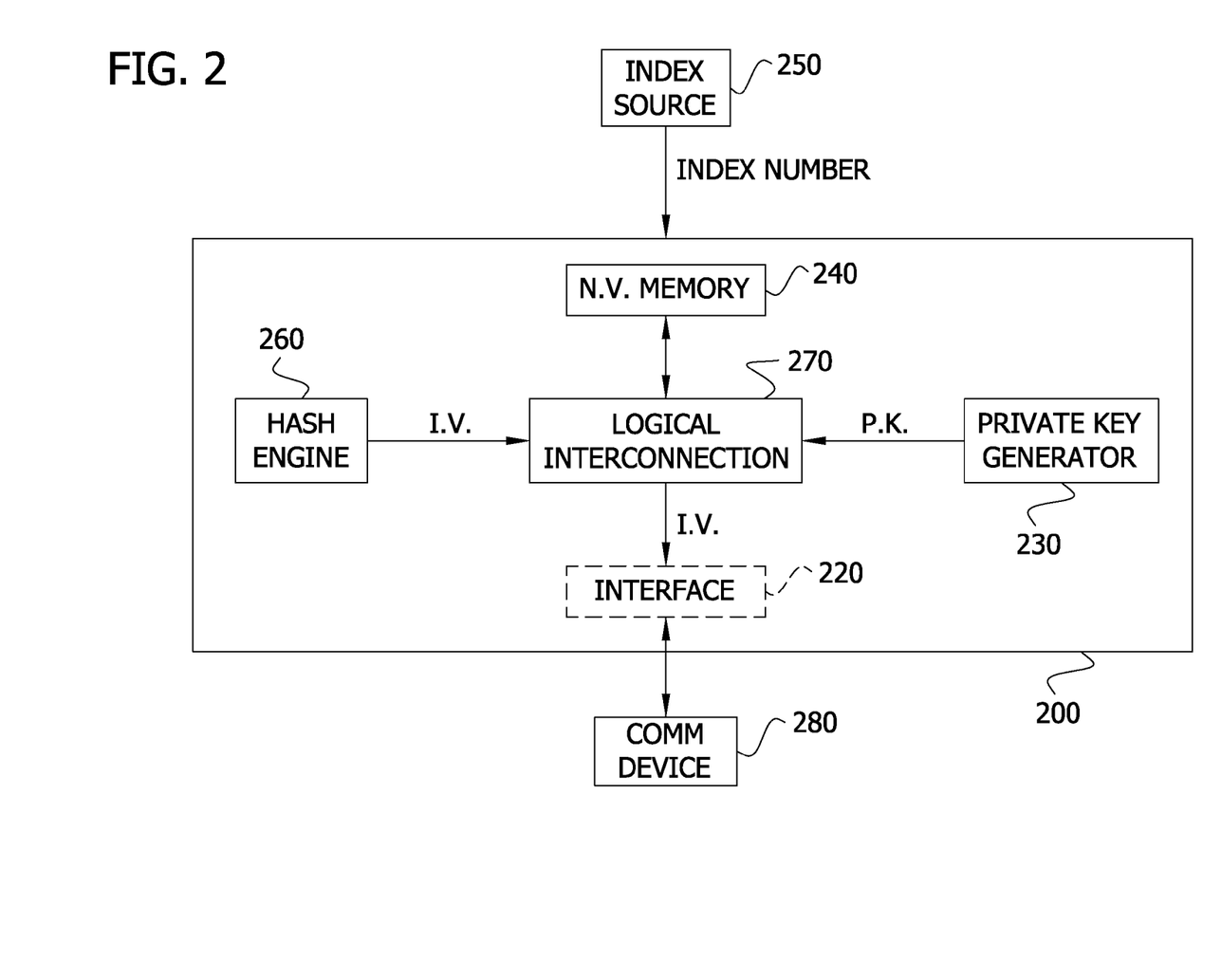
FIG. 2 is a block diagram of a secure authentication device in accordance with one embodiment of the invention.

FIG. 2 is a block diagram of the secure authentication device 200 according to one embodiment. The secure authentication device 200 includes an optional interface 220 (shown with dashed lines), a private key generator 230 (e.g., an entropy source) for generating a private key (P.K.), a non-volatile memory 240 for storing at least the private key, an index source 250 providing an index number, a hash engine 260, and a logical interconnection 270 between the private key generator 230, the non-volatile memory 240, the index source 250, the hash engine 260, and the optional interface 220. The hash engine 260 uses the private key to generate the identifying value (I.V.) which is provided to a communication device 280 via the logical interconnection 270 and any optional interface 220. As noted herein, the identifying value is for use in authenticating the device 200. The interface 220 is optional because the logical interconnection 270 may communicate directly with the communication device 280. The optional interface 220 may be a serial interface, an inter-integrated circuit ($I^2C$) interface, a system packet interface (SPI), or generally any interface capable of communicating between the logical connection 270 and the communication device 280 (e.g., a mobile phone). The interface 220 may be wired and/or wireless and may be part of the communication device 280.

The logical interconnection 270 may be any circuit capable of communicating between the private key generator 230, the non-volatile memory 240, the index source 250, the hash engine 260, and the communication device 280 via the optional interface 220. For example, the logical interconnection 230 may be an application specific integrated circuit (ASIC), a field-programmable gate array (FPGA), a complex programmable logic device (CPLD), or generally any programmable logic or programmable device.

The hash engine 260 may be any engine capable of performing a hash, such as a cryptographic hash. In one embodiment, the hash engine 240 performs one or more of Secure Hash Algorithm (SHA) hashes, such as SHA-256, or SHA-512, RACE Integrity Primitives Evaluation Message Digest (RIPEMD) hashes, such as RIPEMD-128 or RIPEMD-160, Message-Digest algorithm 5 (MD5) hashes, or generally any hash algorithm. In one embodiment, the hash engine 260 may implement a symmetric cryptographic authentication protocol, such as TESLA (timed efficient stream loss-tolerant authentication).

The private key generator 230 may be any source capable of generating a substantially random number to be used as a private key. In one embodiment, the private key generator 230 may be the random number generator disclosed in U.S. patent application Ser. No. 13/511,405 entitled "Random Number Generator," filed on Nov. 18, 2010 which claims priority from U.S. Patent Application No. 61/264,625 which was filed the same day as the U.S. Patent Application No. 61/264,312 from which the present application claims priority. U.S. patent application Ser. No. 13/511,405 is incorporated by reference herein. The memory 240 may be non-volatile memory capable of storing a private key, such as a random number, and an end date/time. The index source 250 may be a clock source, an internal oscillator, or generally any oscillating signal generator source integral with or separate from the device 200. Alternatively, the index source 250 may be internal time references (or the ability to determine the approximate passage of time) which do not require active power or clock sources. As used herein, the index source 250 may be a port or input to device 200 so that the index generator or clock would be external to device 200.

In operation in one embodiment, the private key generator 230 generates a random number to be used as the private key (P.K.). In this embodiment, it is assumed that the index source 250 is a clock, that the index number may represent a current date/time and that a future end date/time is used as a reference number. The reference number may be stored in the memory 240, in which case the logical interconnection has internal logic configured such that only a hash engine 260 can access the reference number. Alternatively, the reference number may be stored in a separate memory (not shown). The logical interconnection 230 stores the random number in the memory 240, and the logical interconnection has internal logic configured such that only the hash engine 260 can access the random number. When the secure authentication device 200 is paired with a verifying device such as server 120, the logical interconnection 270 identifies the current date/time and indicates to the hash engine 260 a number of seconds from the end date/time stored in the memory 240 and the current date/time. The current date/time may be identified internally by the secure authentication device 200 so as to prevent a third party from providing a date/time in the future to the secure authentication device 200. The hash engine 260 then performs a number of hashes on the random number, the number of hashes derived from the number of seconds. The resulting hash value (i.e., the identifying value I.V.), the current date/time, and an identifier of the secure authentication device 200 are provided to the server 120. In one embodiment, the identifier of the secure authentication device 200 is pre-programmed into the memory 240 of the secure authentication device 200.

Alternatively, the server 120 may provide an identifier to the secure authentication device 200 upon receiving the hash value and the current date/time from the secure authentication device 200. In this embodiment, the secure authentication device 200 stores the device identifier in the memory 260, and the server 120 stores the hash value, the current date/time and the device identifier externally to the secure authentication device 200, such as in a data store. The initial keying operations of the secure authentication device are discussed in more detail in FIG. 4 below.

In an authentication operation, the logical interconnection 270 indicates to the hash engine 260 the difference in seconds between the current date/time as indicated by the clock and the end date/time stored in memory 240. The hash engine 260 performs a number of hashes on the random number derived from the indicated number of seconds. The logical interconnection 270 via the optional interface 220 provides the hash value, the current date/time and the device identifier to a verifying device such as server 120. The server 120 then continues to hash the hash value for a number of times derived from the number of seconds since the prior authentication of the secure authentication device 200 or the initialization of the secure authentication device 200. The resulting hash value should equal the previous hash value provided by the secure authentication device 200. The operations of verifying or authenticating a secure authentication device 200 are discussed in more detail in FIGS. 4-5 below.

Thus, in one embodiment as illustrated in FIG. 2, the invention comprises a device including the logical interconnection 270 and the non-volatile memory 240 connected to the logical interconnection 270. The private key generator 230 generates the private key P.K. and is connected to the logical interconnection 270 for providing the private key P.K. via the logical interconnection 270 to the non-volatile memory 240 for storing the private key P.K. in the non-volatile memory 240. The hash engine 260 connects to the logical interconnection 270 and receives the private key P.K. via the logical interconnection 270, performing a number of hashes on the private key P.K. to generate the identifying value I.V., the number of hashes based on the index number indicated by the index source 250 (e.g., based on the difference between the index number and a reference number). The logical interconnection 270 via the optional interface 220 provides the identifying value I.V. to a verifying device, such as server 120.

In one embodiment, the logical interconnection 270, the private key generator 230, the non-volatile memory 240 and the hash engine 260 constitute a unitary, integrated device, such as an ASIC, and/or FPGA, and/or CPLD. The unitary, integrated device is configured such that the logical interconnection 270 stores the private key only in the non-volatile memory 240 and provides the private key stored in the non-volatile memory 240 only to the hash engine 260. As a result, the unitary, integrated device is configured such that the private key stored in the non-volatile memory is inaccessible by other devices so that other devices cannot obtain the private key to compromise security. In other words, other devices cannot read the private key stored in the unitary, integrated device because such a device does not present a port or input/output which can be accessed.

In one embodiment implementing TESLA (timed efficient stream loss-tolerant authentication), it is contemplated that the number of hashes by the hash engine 260 is based on and may be derived from the difference between the index number provided by the index source 250 and a reference number. For example, if the index source is a clock source and the index number is a clock number, then the number of hashes may be based on the difference between the clock number and a reference time. As a more specific example, the clock number may be a current timestamp and the reference time may be an end timestamp so that the number of hashes is based on the difference between the current timestamp and an end timestamp. In some embodiments, the end timestamp comprises a far future date to exceed the life expectancy of the secure authentication device 200. As used herein, a far future date means a date such as the current date/time plus at least ten years or a date such as the current date/time plus at least fifty years or more.

In one embodiment implementing TESLA (timed efficient stream loss-tolerant authentication), it is contemplated that the secure authentication device 200 comprises a cryptographically secure authentication chip, which uses the private key generator 230 to create a "base key" named $K_0$ which is a root key and is not released publicly. This base key $K_0$ is used as an origin for the TESLA key chain which consists of indices 1 . . . N and associated keys $K_1$ . . . $K_N$ where each successive key $K_i$ is computed as a cryptographically secure hash of the previous key $K_{i-1}$ using the formula $K_i$=SHA256_HASH(i-1|$K_{i-1}$). During the manufacturing of the device 200 an authorized facility, upon initialization and internal keying, only N and $K_N$ are disclosed from the device 200 and represent "a cryptographic DNA signature" for the device 200. In this manner, a TESLA key-chain is created internal to the device 200 and is not exposed. Subsequent releases of indices and keys from the device 200 can later be used for absolute authentication of an endpoint, indicating its pedigree as an authorized manufactured product.

Figure 3:
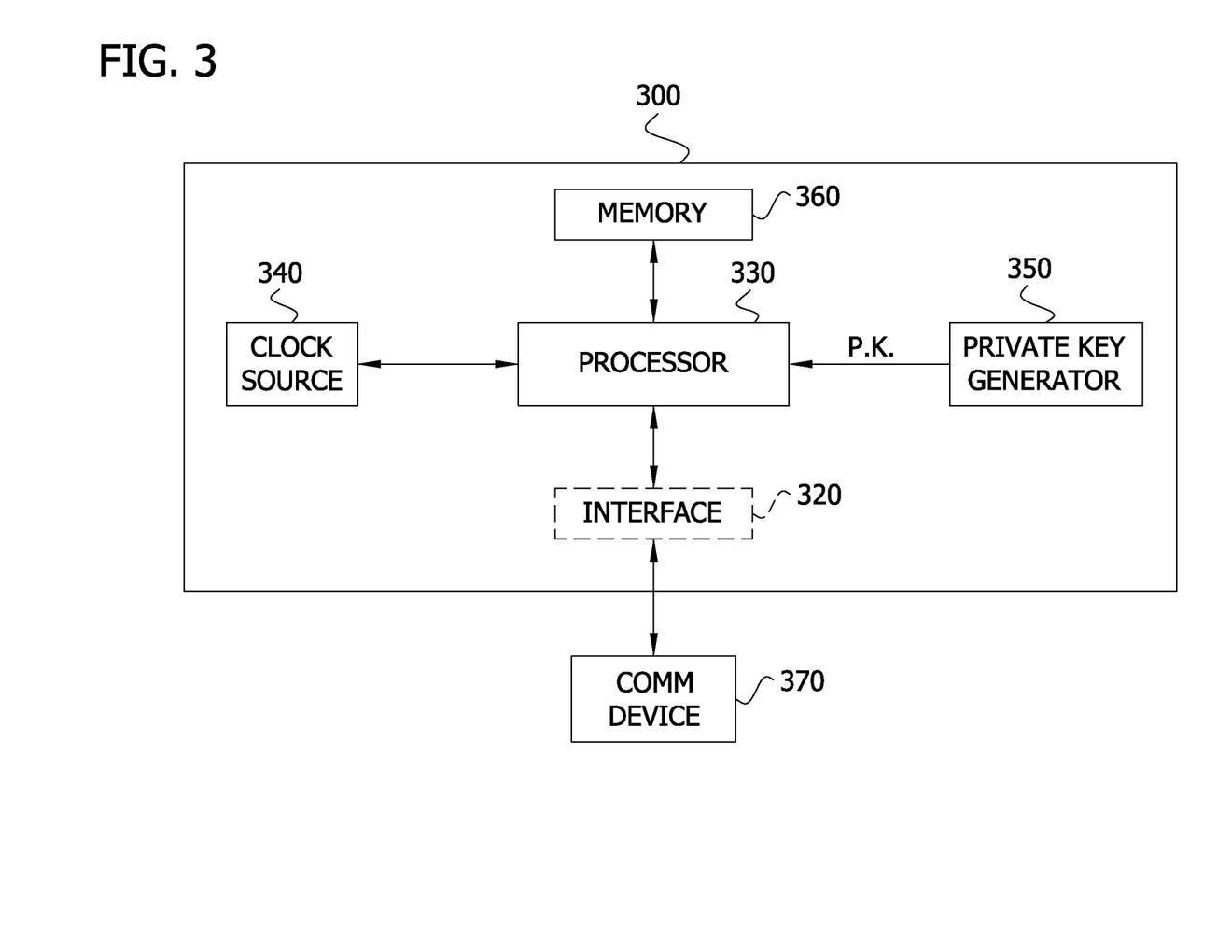
FIG. 3 is a block diagram of a secure authentication device including a processor in accordance with one embodiment of the invention.

FIG. 3 is a block diagram of a secure authentication device having a processor, referred to herein as a secure authentication processor 300, according to one embodiment. The secure authentication processor 300 includes a processor 330, an index source such as a clock source 340, a private key generator 350, and a memory 360. The device 300 may include an optional interface 320 for communicating with a communication device 370, such as a mobile phone. The interface 320 is optional because the processor 330 may communicate directly with the communication device 370. The processor 330 may be a microprocessor, a controller, or generally any processor. In this embodiment, the processor 330 provides the interconnection between the private key generator and the memory 260. In one embodiment, the processor 330 is part of a circuit which is not accessible externally to the circuit, which may be an ASIC, and/or FPGA, and/or CPLD. It is also contemplated that the processor 330 may be configured or programmed to perform one or more hash algorithms, such as a Secure Hash Algorithm (SHA) hashes, RACE Integrity Primitives Evaluation Message Digest (RIPEMD) hashes, Message-Digest algorithm 5 (MD5) hashes, or generally any hash algorithms. Alternatively, the processor may interconnect with a separate hash engine (not shown in FIG. 3; see FIG. 2, for example). Alternatively, the processor 330 may be a separate processor such as a processor of a communication device 370. However, using a separate processor as processor 330 may impact the security of the device 300 if the separate processor is accessible, as it may permit other devices to access the private key stored in the memory 360. The private key generator 350 may be any source capable of generating a substantially random number to be used as a private key.

In operation in one embodiment, the private key generator 350 generates a random number to be used as a private key. The processor 330 determines an end date/time and stores the end date/time and the random number in the memory 360. When the secure authentication processor 300 is paired with a verifying device such as server 120, the processor 330 identifies the current date/time and determines a difference such as a number of seconds from the end date/time stored in the memory 360 and the current date/time. The current date/time is often identified internally by the secure authentication processor 300 so as to prevent a third party from providing a date/time in the future to the secure authentication processor 300. The processor 330 then performs a number of hashes derived from the number of seconds on the random number. The resulting hash value, the current date/time, and an identifier of the secure authentication processor 300 are provided to a verifying device, such as server 120 to which the processor is paired. The identifier of the secure authentication processor 300 may be pre-programmed into the memory 360 of the secure authentication processor 300. Alternatively, the verifying device may provide an identifier to the secure authentication processor 300 upon receiving the hash value and the current date/time from the secure authentication processor 300. The secure authentication processor 300 stores the device identifier in the memory 360, and the verifying device stores the hash value, the current date/time and the device identifier externally to the secure authentication processor 300, such as in a data store. The initial keying operations of the secure authentication processor 300 are discussed in more detail in FIG. 4 below.

In an authentication operation, the processor 330 retrieves the end date/time and the random number from the memory 360. The processor 330 identifies the current date/time and determines the number of seconds between the current date/time and the end date/time. The processor 330 then performs a number of hashes on the random number derived from the determined number of seconds. The processor 330 via the optional interface 320 provides the hash value, the current date/time and the device identifier to a verifying device, such as server 120. The verifying device then continues to hash the hash value for a number of times derived from the number of seconds since the prior authentication of the secure authentication processor 300 or the initialization of the secure authentication processor 300. The resulting hash value should equal the previous hash value provided by the secure authentication processor 300. The operations of verifying or authenticating a secure authentication processor 300 are discussed in more detail in FIGS. 4-5 below. Alternatively, in one embodiment, the processor 330 may use a reference and an index number instead of the end date/time and the current date/time.

FIG. 4A is a flow chart illustrating an exemplary internal keying operation of the secure authentication device of FIG. 2, or other secure authentication devices embodiments of the invention. The operations of FIG. 4A are described as being performed by the secure authentication device 200, or specific components thereof. However, the operations may be performed by any of the components of the secure authentication device 200 or of the secure authentication processor 300, such as any of the components described in FIGS. 2-3 above. For explanatory purposes, the operations of FIG. 4A are illustrated and discussed as linear. However, the operations of FIG. 4A may also operate in parallel, i.e. one or more of the operations may be performed simultaneously. In one embodiment, the internal keying operation of FIG. 4A may be implemented in computer/processor executable instructions stored on a computer/processor readable tangible storage media, such as a non-volatile memory. In another embodiment, the instructions may be implemented by programmable logic.

At 401, a random number is generated by the private key generator 230 of the secure authentication device 200. At 402, the secure authentication device 200 identifies or determines a reference number (e.g., an end date/time). Alternatively, the reference number may be programmed into the memory 260 of the secure authentication device 200 at the time of manufacture. In one embodiment, the index number is taken from a series of decreasing numbers so that the second index number generated at a later time of authentication is less than the first index generated at an earlier time.

At 403, the secure authentication device 200 stores the random number and the reference number, such as in the memory 240. At 404, the secure authentication device 200 determines a difference between the reference number and an index number, such as provided by index source 250. At 405, the secure authentication device 200 hashes the random number a number of times derived from the determined difference. At 406, the secure authentication device 200 outputs, the hash, the index number and/or a device identifier to a verifying device such as a server 120 to which the device 200 is paired. The verifying device may assign a device identifier to the secure authentication device 200 and/or may provide the device identifier to the secure authentication device 200. The secure authentication device 200 may store the device identifier in the memory 240. Since the device 200 stores the random number in memory 240 via the logic interconnection 270, the random number is not accessible externally so that other device cannot access the random number and compromise the security of the device.

FIG. 4B is a flow chart illustrating another exemplary internal keying operation of the secure authentication device of FIG. 2, or other secure authentication devices embodiments of the invention. The operations of FIG. 4B are described as being performed by the secure authentication device 200, or specific components thereof. However, the operations may be performed by any of the components of the secure authentication device 200 or of the secure authentication processor 300, such as any of the components described in FIGS. 2-3 above. For explanatory purposes, the operations of FIG. 4B are illustrated and discussed as linear. However, the operations of FIG. 4B may also operate in parallel, i.e. one or more of the operations may be performed simultaneously. In one embodiment, the internal keying operation of FIG. 4B may be implemented in computer/processor executable instructions stored on a computer/processor readable tangible storage media, such as a non-volatile memory. In another embodiment, the instructions may be implemented by programmable logic.

At 410, a random number is generated by the private key generator 230 of the secure authentication device 200. At 420, the secure authentication device 200 identifies an end date/time. The end date/time may be identified such that the end date/time exceeds the life expectancy of the secure authentication device 200, such as the current date/time plus fifty years. Alternatively, the end date/time may be programmed into the memory 260 of the secure authentication device 200 at the time of manufacture.

At 430, the secure authentication device 200 stores the random number and the end date/time, such as in the memory 240. At 440, the secure authentication device 200 determines an amount of time from the current date/time to the end date/time. The amount of time may be measured in any increment of time, such as seconds, minutes, milliseconds, days, etc. At 450, the secure authentication device 200 hashes the random number a number of times derived from the determined amount of time. At 460, the secure authentication device 200 outputs, the hash, the current date/time and a device identifier to a verifying device, such as a server 120 to which the device 200 is paired. Alternatively, the secure authentication device 200 may output the hash and the current date/time. The verifying device may assign a device identifier to the secure authentication device 200 and/or may provide the device identifier to the secure authentication device 200. The secure authentication device 200 may store the device identifier in the memory 240.

Figure 5:
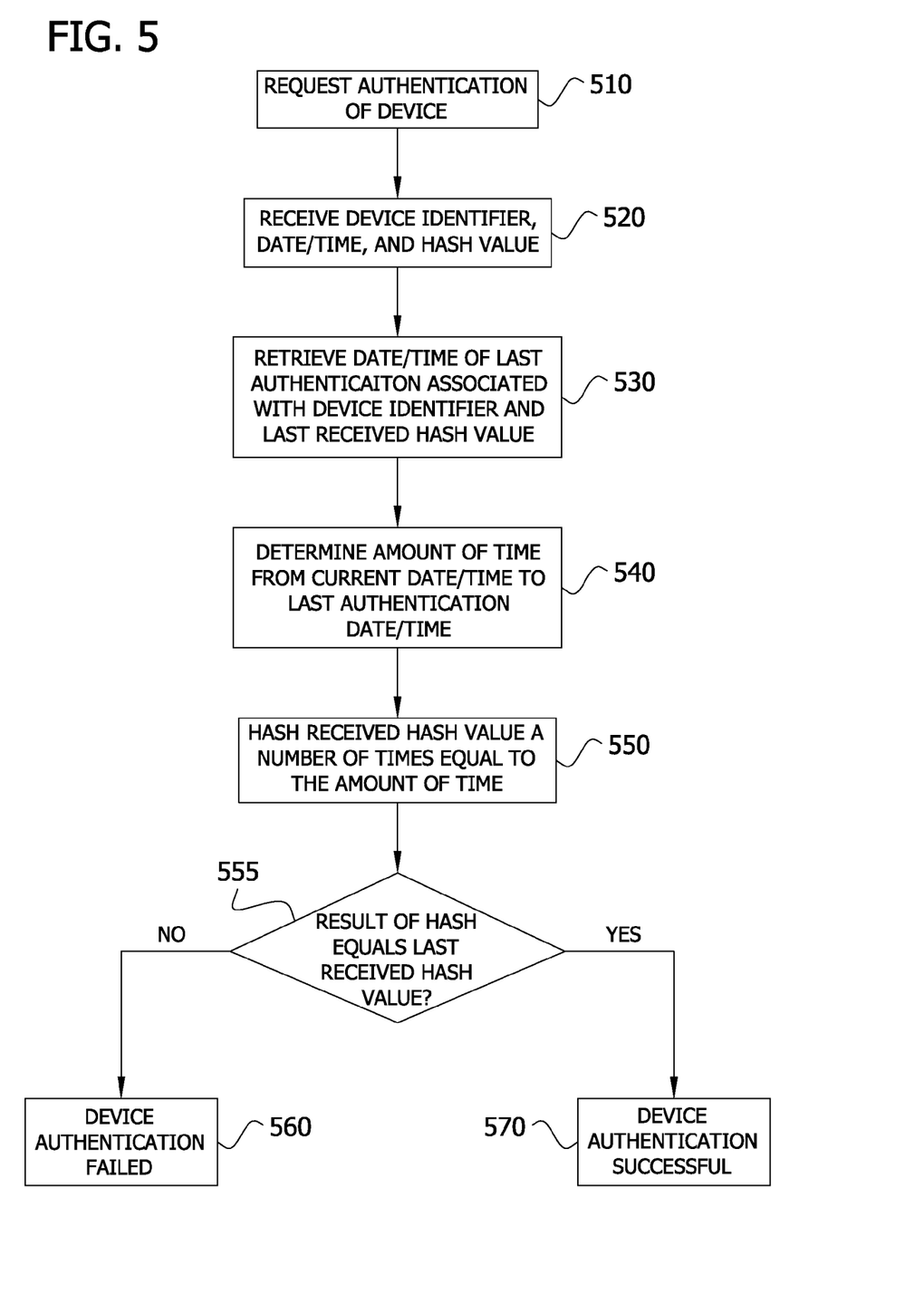
FIG. 5 is a flowchart illustrating the operation of a verifying device authenticating the secure authentication device of FIG. 2, or other secure authentication device in accordance with embodiments of the invention.

FIG. 5 is a flowchart illustrating the operation of a verifying device such as server 120 authenticating the secure authentication device 200, or other secure authentication devices. For explanatory purposes, the operations of FIG. 5 are illustrated and discussed as operating linearly. However, the operations of FIG. 5 may also operate in parallel, i.e. one or more of the operations may operate simultaneously.

At 510, the server 120 requests the secure authentication device 200 to authenticate itself. Alternatively or in addition, the secure authentication device 200 may initiate a request to authenticate itself with the server 120. For example, the secure authentication device 200 may wish to communicate data to the server 120, and the server 120 may require that the secure authentication device 210 authenticate before communicating the data. At 520, the processor 124 of server 120 receives from the secure authentication device 200 via interface 122 the following information: a device identifier, a date/time and a hash value. The received information is stored in memory 126. At 530, the processor 124 of the server 120 retrieves from memory 126 the date/time of the prior authentication of the secure authentication device 200 associated with the device identifier, such as from a data store. The server 120 also retrieves from memory 126 the prior hash value received from the secure authentication device 200. The date/time of the prior authentication of the secure authentication device 200 associated with the device identifier and the prior hash value received from the secure authentication device 200 may be from the initial pairing of the device 200 with the server 120.

At 540, the processor 124 of server 120 determines the amount of time from the received date/time to the prior authentication date/time. The amount of time may be measured in any time increment, such as seconds, minutes, days, etc; however, the time increment should be the same time increment used when the secure authentication device 200 was paired with the server 120. For example, if the time increment used when the secure authentication device 200 was paired with the server 120 was measured in seconds, then the amount of time from the receive date/time to the prior authentication date/time should also be measured in seconds.

At 550, the processor 124 of the server 120 hashes the hash value received from the secure authentication device 200 a number of times derived from the determined amount of time. For example, if the determined amount of time is one hundred seconds, the secure authentication device 200 may hash the hash value one hundred times. At 555, the processor 124 of the server 120 determines whether the result of the hash equals the prior hash value received from the secure authentication device 200. If, at 555, the processor 124 of the server 120 determines that the result of the hash does not equal the prior received hash, the server 120 moves to 560. At 560, the processor 124 of the server 120 determines that the authentication of the secure authentication device 200 has failed. The server 120 may communicate to the secure authentication device 200 that the authentication has failed. If, at 555, the processor 124 of the server 120 determines that the result of the hash equals the prior received hash, the server 120 moves to 570. At 570, the processor 124 of the server 120 determines that the authentication is successful. The server 120 may communicate to the secure authentication device 200 that the authentication has failed.

Figure 6:
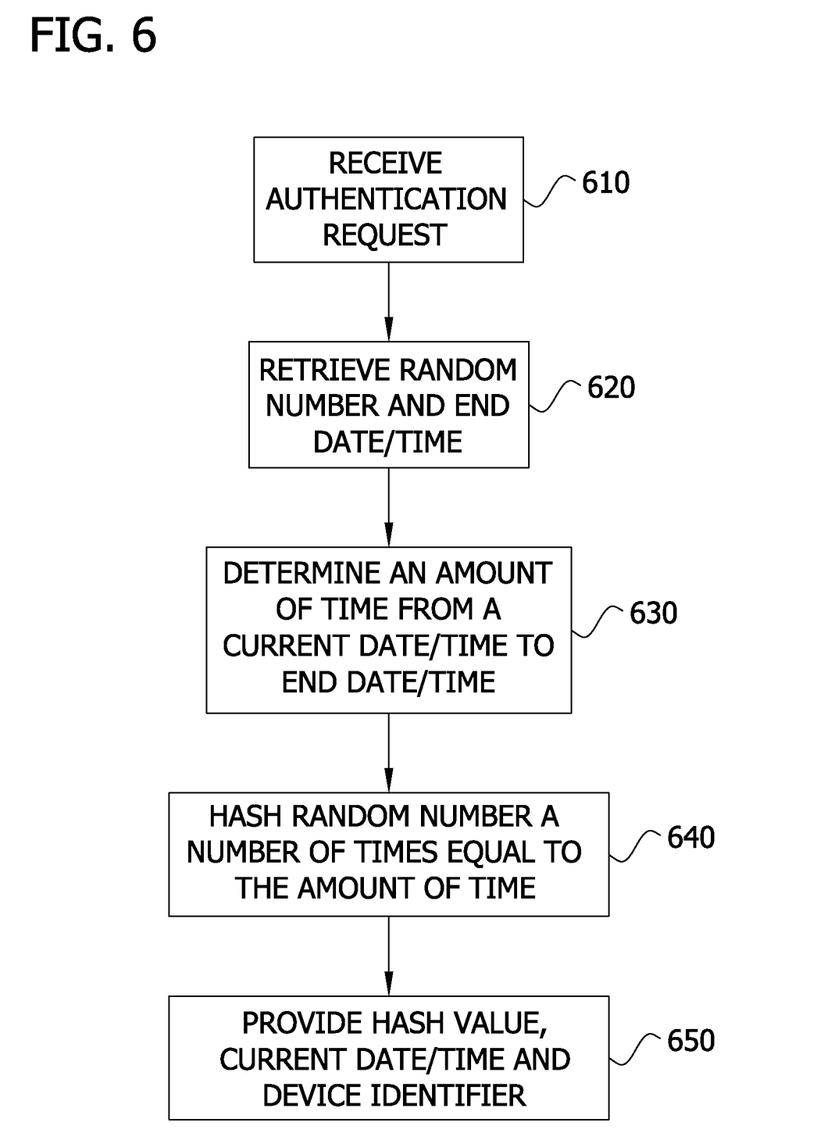
FIG. 6 is a flowchart illustrating an authentication operation of the secure authentication device of FIG. 2, or other secure authentication device in accordance with embodiments of the invention.

FIG. 6 is a flowchart illustrating an authentication operation of the secure authentication device of FIG. 2, or other secure authentication devices. The operations of FIG. 6 are described as being performed by the secure authentication device 200, or specific components thereof. However, the operations may be performed by any of the components of the secure authentication device 200 or of the secure authentication processor 300, such as any of the components described in FIGS. 2-3 above. For explanatory purposes, the operations of FIG. 6 are illustrated and discussed as operating linearly. However, the operations of FIG. 6 may also operate in parallel, i.e. one or more of the operations may operate simultaneously.

At 610, the secure authentication device 200 receives an authentication request, such as from a server 120. Alternatively or in addition, the secure authentication device 200 may request to authenticate with the server 120. For example, the secure authentication device 200 may wish to communicate data, or perform an action on the server 120, or vice-versa. Alternatively, the server 120 may wish to verify the identity of the secure authentication device 200. At 620, the secure authentication device 200 retrieves the random number and the end date/time (i.e., a reference number) from the memory 260. At 630, the secure authentication device 200 determines an amount of time from a current date/time to the end date/time (i.e., the device 200 determines a difference between an index number and the reference number). The amount of time may be measured in any increment of time, such as seconds, minutes, days, etc.

At 640, the secure authentication device 200 hashes the random number a number of times derived from the determined amount of time (i.e., based on the difference). For example, if the amount of time is one thousand seconds, the secure authentication device 200 may hash the random number one thousand times. At 650, the secure authentication device 200 provides the hash value, the current date/time, and a device identifier, if any, to the server 120, such as through the optional interface 220 (i.e., the device 200 provides the identifying value and the index number to the verifying device for use in authenticating the device).

Figure 7:
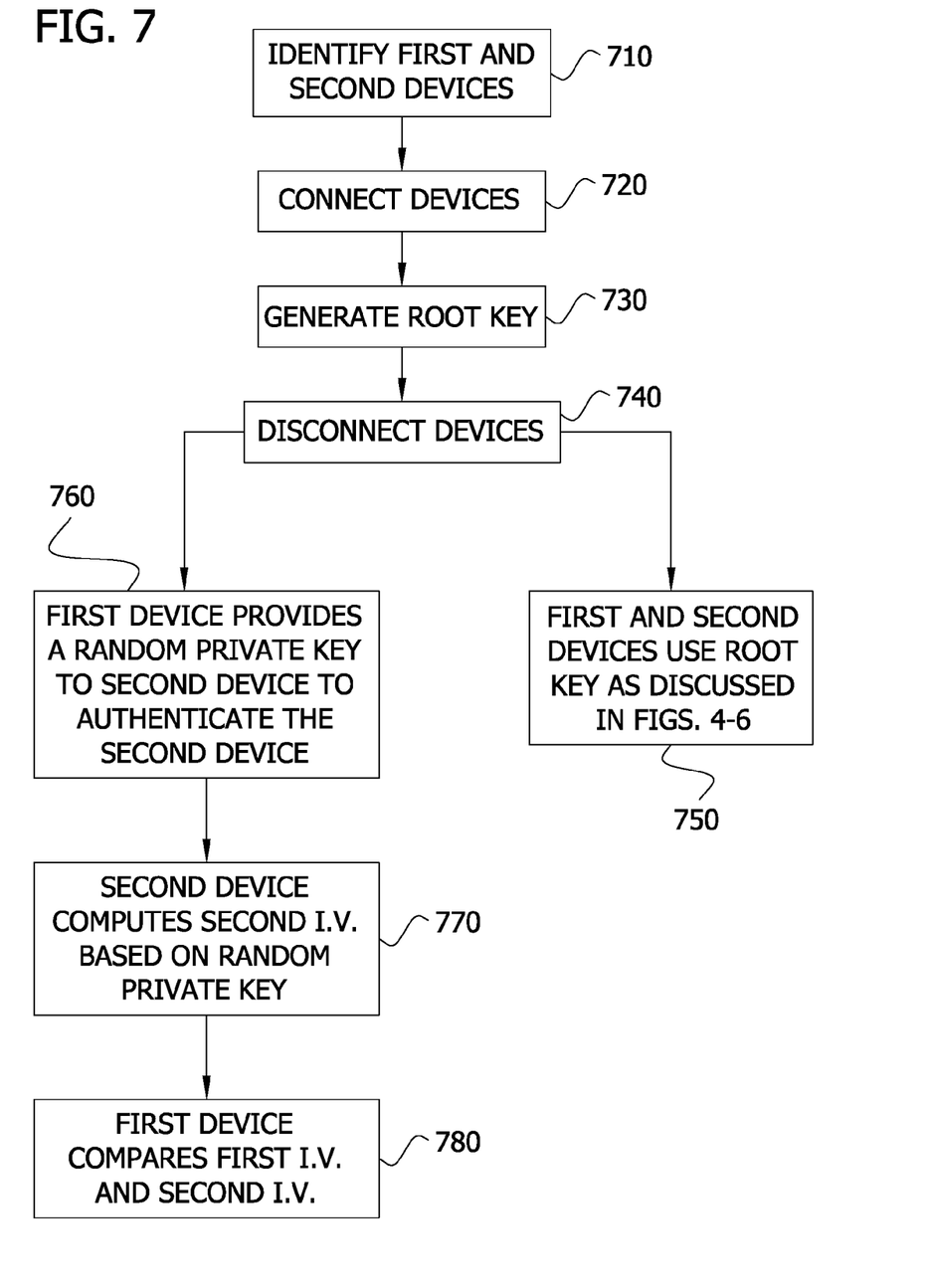
FIG. 7 is a flowchart illustrating an internal keying and/or a cryptographic key sharing operation of the secure authentication device of FIG. 2, or other secure authentication device in accordance with embodiments of the invention.

FIG. 7 is a flowchart illustrating an internal keying and/or a cryptographic key sharing operation of the secure authentication device of FIGS. 1-3, or other secure authentication devices. The operations of FIG. 7 are illustrated and described as being performed by secure authentication devices 200, or specific components thereof However, the operations may be performed by any of the components of the secure authentication devices 200 or of the secure authentication processor 300, such as any of the components described in FIGS. 1-3 above. For explanatory purposes, the operations of FIG. 7 are discussed as operating linearly. However, the operations of FIG. 7 may also operate in parallel, i.e. one or more of the operations may operate simultaneously. For explanatory purposes, the operations of FIG. 7 are discussed with regard to the sharing of cryptographic keys used in the hashing operations. However, the operations of FIG. 7 may also include the sharing of private keys with the cryptographic keys or the sharing of only private keys.

At 710, a first secure authentication device 200 and a second secure authentication device 200' are identified. In one embodiment, the second secure device 200' comprises the server 120. The first and second secure authentication devices may be devices which may engage in secure communications. At 720, the first secure authentication device 200 is connected to the second secure authentication device 200'. The secure authentication devices may be connected using a wired connection, so as to minimize the risk of the communication being intercepted or otherwise determined Alternatively, the secure authentication devices may be connected using a wireless connection. At 730, the connected secure authentication devices perform secure key establishment to arrive at a common root key and/or a common private key to be used by their hash engines (example is Diffie Hellman key exchange). At 740, the devices are disconnected from each other and separated, ready for use. The messages may be encrypted and/or authenticated using the operations discussed in FIGS. 4-6 and/or as noted below.

At 750, the first secure authentication device 200 and the second secure authentication device 200' use the shared root key to communicate encrypted messages back and forth, and/or to authenticate communications back and forth. With regard to communication between the first secure authentication device 200 and the second secure authentication device 200', both devices have the same authentication chain for the aforementioned use, and both can also compute a separate crypto-key-chain. Secure communications between the devices by using identical crypto-keys (for symmetric key cryptography) is now possible by the first device exposing only a common index number to the second device. Since the crypto keys and/or the random numbers have not been exposed externally by the devices, communications between the devices may be substantially secure.

With regard to one of the devices authenticating the other, the following is also contemplated as an alternative or in addition to the above. At 760, the first device 200 may authenticate the second device 200' by providing a random private key to the second device 200' (or visa versa). The first device uses the shared common root key to compute a first identifying value based on the provided random private key. At 770, the second device would use the shared common root key to compute a second identifying value based on the provided random private key. The computed second identifying value is provided to the first device to authenticate the second device. At 780, the first device compares the second identifying value to its first identifying value. If the second identifying value equals the first identifying value, the second device is authenticated; otherwise, the second device is not authenticated. In other words, the second device verifies to the first device that it knows the shared root key and is able to perform the same hashing operations as the first device on a random private key provided by the first device to the second device.

Thus, in one embodiment, the invention comprises a method for cryptographically pairing a first device 200 having a first hash engine 260 and a first private key generator 230 for generating a first private key P.K. to a second device 200'. At 710, the second device 200' having a second hash engine 260' and a second private key generator 230' for generating a second private key P.K.' is identified. The first device 200 and the second device 200' are connected at 720 and generate a common root key at 730. The devices are disconnected at 740. The common root key and the first private key are used by the first hash engine 260 of the first device 200 to cryptographically communicate with the second device 200' and the common root key and the second private key are used by the second hash engine 260' of the second device 200 to cryptographically communicate with the first device 200.

In another embodiment, a method for pairing devices for cryptographic communication is provided. A first device 200 and a second device 200' are identified at 710. Each device may be as illustrated in FIG. 2. The first device 200 is connected to the second device 200' and a common root key is generated by the connected devices for use by each hash engine of each device. The first device 200 uses the common root key via its hash engine to cryptographically communicate with the second device 200' and visa versa. Optionally, each device may have an index source for use by the hash engine wherein each hash engine generates an identifying value based on the index source, the private key and the common root key. The generated identifying value is provided via the logical interconnection for use in authenticating the device.

In one embodiment, a cryptographic electronic device 200 is provided including a private key generator 230 for generating a private key P.K.; a non-volatile memory 240 for storing at least the private key; a hash engine 260 using the private key and using a common root key used by at least one other device 200' to which this device 200 is paired; and a logical interconnection 270 between the private key generator, the non-volatile memory and the hash engine. The hash engine generates an identifying value based on the private key and the common root key. The identifying value is provided via the logical interconnection for use in authenticating the device 200 with the other device 200' and the common root key is used to cryptographically communicate with the other device 200'.

In one embodiment, a system for cryptographic communication comprises a plurality of devices, wherein each device 200 comprises:

a private key generator 230 for generating a private key;
a non-volatile memory 240 for storing at least the private key;
a hash engine 260 using a common root key and the private key; and
a logical interconnection 270 between the private key generator, the non-volatile memory, and the hash engine.

Each of the devices shares the common root key which is generated by connecting the devices together. Each of the hash engines of each of the devices 200 is configured to use the common root key to cryptographically communicate with other devices 200' of the plurality of devices.

As a result, two separate chains can be computed using (at least) a single different bit in the hash chain for each computed chain, and thus the two chains generate two identifying values, each of which appears to be "unrelated" to the other unless one knows the "root random" (i.e., the root key and/or the random number) by which both chains and resulting identifying values were generated. This provides both authentication and cryptographic security using the same mechanism but two different chains.

The methods described herein may be implemented by software programs executable by a computer system. Further, implementations may include distributed processing, component/object distributed processing, and parallel processing. Alternatively or in addition, virtual computer system processing maybe constructed to implement one or more of the methods or functionality as described herein.

The illustrations described herein are intended to provide a general understanding of the structure of various embodiments. The illustrations are not intended to serve as a complete description of all of the elements and features of apparatus, processors, and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

The above disclosed subject matter is to be considered illustrative, and not restrictive, and the appended claims are intended to cover all such modifications, enhancements, and other embodiments, which fall within the true spirit and scope of the description. Thus, to the maximum extent allowed by law, the scope is to be determined by the broadest permissible interpretation of the following claims and their equivalents, and shall not be restricted or limited by the foregoing detailed description.

For purposes of illustration, programs and other executable program components, such as the operating system, are illustrated herein as discrete blocks. It is recognized, however, that such programs and components reside at various times in different storage components of the computer, and are executed by the data processor(s) of the computer.

Although described in connection with an exemplary computing system environment, embodiments of the invention are operational with numerous other general purpose or special purpose computing system environments or configurations. The computing system environment is not intended to suggest any limitation as to the scope of use or functionality of any aspect of the invention. Moreover, the computing system environment should not be interpreted as having any dependency or requirement relating to any one or combination of components illustrated in the exemplary operating environment. Examples of well known computing systems, environments, and/or configurations that may be suitable for use with aspects of the invention include, but are not limited to, personal computers, server computers, hand-held or laptop devices, multiprocessor systems, microprocessor-based systems, set top boxes, programmable consumer electronics, mobile telephones, network PCs, minicomputers, mainframe computers, distributed computing environments that include any of the above systems or devices, and the like.

Embodiments of the invention may be described in the general context of computer-executable instructions, such as program modules, executed by one or more computers or other devices. Generally, program modules include, but are not limited to, routines, programs, objects, components, and data structures that perform particular tasks or implement particular abstract data types. Aspects of the invention may also be practiced in distributed computing environments where tasks are performed by remote processing devices that are linked through a communications network. In a distributed computing environment, program modules may be located in both local and remote computer storage media including memory storage devices.

In operation, computers and/or servers may execute the computer-executable instructions such as those illustrated herein to implement aspects of the invention.

The order of execution or performance of the operations in embodiments of the invention illustrated and described herein is not essential, unless otherwise specified. That is, the operations may be performed in any order, unless otherwise specified, and embodiments of the invention may include additional or fewer operations than those disclosed herein. For example, it is contemplated that executing or performing a particular operation before, contemporaneously with, or after another operation is within the scope of aspects of the invention.

Embodiments of the invention may be implemented with computer-executable instructions. The computer-executable instructions may be organized into one or more computer-executable components or modules on a tangible computer readable storage medium. Aspects of the invention may be implemented with any number and organization of such components or modules. For example, aspects of the invention are not limited to the specific computer-executable instructions or the specific components or modules illustrated in the figures and described herein. Other embodiments of the invention may include different computer-executable instructions or components having more or less functionality than illustrated and described herein.

When introducing elements of aspects of the invention or the embodiments thereof, the articles "a," "an," "the," and "said" are intended to mean that there are one or more of the elements. The terms "comprising," "including," and "having" are intended to be inclusive and mean that there may be additional elements other than the listed elements.

In view of the above, it will be seen that several advantages of the invention are achieved and other advantageous results attained.

Not all of the depicted components illustrated or described may be required. In addition, some implementations and embodiments may include additional components. Variations in the arrangement and type of the components may be made without departing from the spirit or scope of the claims as set forth herein. Additional, different or fewer components may be provided and components may be combined. Alternatively or in addition, a component may be implemented by several components.

Having described aspects of the invention in detail, it will be apparent that modifications and variations are possible without departing from the scope of aspects of the invention as defined in the appended claims. As various changes could be made in the above constructions, products, and methods without departing from the scope of aspects of the invention, it is intended that all matter contained in the above description and shown in the accompanying drawings shall be interpreted as illustrative and not in a limiting sense.

What is claimed is:

1. An electronic device comprising:
a private key generator for generating a private key;
a non-volatile memory for storing at least the private key;
an index source;
a hash engine; and
a logical interconnection between the private key generator, the non-volatile memory, the index source, and the hash engine;
said hash engine receiving the private key via the logical interconnection and performing a number of hashes on the private key to generate an identifying value provided via the logical interconnection,
wherein the identifying value is for use in authenticating said device,
wherein the number of hashes is based on the difference between a reference number stored in the non-volatile memory and a selected index number selected from a series of decreasing index numbers indicated by the index source, and wherein a first selected index number at a first time is greater than a second selected index number at a second time later than the first time.

2. The device of claim 1 wherein the reference number is a reference time stored in the non-volatile memory, wherein the index source is a clock source, wherein the index number is a clock number, and wherein the number of hashes is derived from the difference between the clock number and the reference time stored in the non-volatile memory.

3. The device of claim 2 wherein the clock number comprises a current timestamp, wherein the reference time comprises an end timestamp and wherein the number of hashes is derived from the difference between the current timestamp and an end timestamp.

4. A device comprising:
a logical interconnection;
a non-volatile memory connected to the logical interconnection;
a private key generator generating a private key, said private key generator connected to the logical interconnection and providing the private key via the logical interconnection to the non-volatile memory for storing the private key in the non-volatile memory;
a hash engine connected to the logical interconnection, said hash engine receiving the private key via the logical interconnection and performing a number of hashes on the private key to generate an identifying value, wherein the number of hashes is based on the difference between a clock number indicated by an index source comprising a clock source and a reference time stored in the non-volatile memory; and
wherein the logical interconnection provides the identifying value for use in authenticating said device.

5. The device of claim 4:
wherein the logical interconnection, the private key generator, the non-volatile memory and the hash engine comprise a unitary, integrated device;
wherein the unitary, integrated device is configured such that the logical interconnection stores the private key only in the non-volatile memory and provides the private key stored in the non-volatile memory only to the hash engine; and
wherein the unitary, integrated device is configured such that the private key stored in the non-volatile memory is inaccessible by other devices so that other devices cannot obtain the private key.

6. The device of claim 4 wherein an identifier of the device, the clock number and the identifying value are stored in the non-volatile memory and wherein the logical interconnection provides the clock number and the identifier for use in authenticating said device.

7. The device of claim 4 wherein the private key generator is a random number generator within the device, wherein the clock number comprises a current timestamp, wherein the reference time comprises an end timestamp and wherein the number of hashes is derived from the difference between the current timestamp and an end timestamp.

8. The device of claim 7 wherein the end timestamp comprises a far future date.

9. The device of claim 4 wherein an identifier is stored in the non-volatile memory and wherein the logical interconnection provides the identifier for use in authenticating said device.

10. The device of claim 1 further comprising an interface connected to the logical interconnection and wherein the identifying value it provided to said interface via the logical interconnection.

11. An electronic device comprising:
a private key generator for generating a private key;
a non-volatile memory for storing at least the private key;
an index source comprising a clock source;
a hash engine;
a logical interconnection between the private key generator, the non-volatile memory, the index source, and the hash engine; and
a processor for transmitting information;
said hash engine receiving the private key via the logical interconnection and performing a number of hashes on the private key to generate an identifying value provided via the logical interconnection, wherein the number of hashes is based on the difference between an clock number indicated by the index source and a reference time stored in the non-volatile memory and wherein the identifying value is for use in authenticating said device.

12. The device of claim 11 wherein the clock number comprises a current timestamp, wherein the reference time comprises an end timestamp and wherein the number of hashes is derived from the difference between the current timestamp and an end timestamp.

13. A system comprising:
a verifying device; and
a plurality of electronic devices, each device comprising:
   a logical interconnection;
   a non-volatile memory connected to the logical interconnection;
   a private key generator generating a private key, said private key generator connected to the logical interconnection and providing the private key via the logical interconnection to the non-volatile memory for storing the private key in the non-volatile memory;
   an index source indicating a clock number;
   a hash engine connected to the logical interconnection, said hash engine receiving the private key via the logical interconnection and performing a number of hashes on the private key to generate an identifying value, the number of hashes based on the clock number; and
   wherein the logical interconnection provides the identifying value and the clock number to the verifying device for use in authenticating said device;
wherein the verifying device receives the identifying value and the clock number, said verifying device performing a number of hashes on the received identifying value based on the received clock number to determine whether the device should be authenticated.

14. The system of claim 13:
wherein the verifying device receives a first identifying value and a first clock number, wherein the verifying device receives a second identifying value and a second clock number, wherein the verifying device performs a number of hashes on the second received identifying value derived from the difference between the first clock number and the second clock number to determine a result, wherein the verifying device compares the result to the first identifying value, said verifying device authenticating the device when the result equals the first identifying value and said verifying device not authenticating the device when the result does not equal the first identifying value.

15. The system of claim 13 wherein the clock number comprises a current timestamp, wherein the reference time comprises an end timestamp and wherein the number of hashes is derived from the difference between the current timestamp and an end timestamp.

16. A method for pairing devices for cryptographic communication, comprising:
identifying a first device and a second device wherein each device comprises:
   a private key generator for generating a private key;
   a non-volatile memory for storing at least the private key;
   a hash engine using a root key and the private key;
   an index source comprising a clock source for use by the hash engine; and
   a logical interconnection between the private key generator, the non-volatile memory, and the hash engine;
connecting the first device and the second device;
generating, by the connected first and second devices, a common root key for use by each hash engine; and wherein the first device uses the common root key via its hash engine to cryptographically communicate with the second device and vice versa;
wherein each hash engine performs a number of hashes on the private key to generate an identifying value based on the private key and the common root key;
wherein the number of hashes is based on the difference between clock number indicated by the index source and a reference time stored in the non-volatile memory; and
wherein the generated identifying value provided via the logical interconnection is for use in authenticating said device.

17. The method of claim 16 wherein the clock number comprises a current timestamp, wherein the reference time comprises an end timestamp and wherein the number of hashes is derived from the difference between the current timestamp and an end timestamp.

18. A cryptographic electronic device comprising:
a private key generator for generating a private key;
a non-volatile memory for storing at least the private key;
a hash engine using the private key and using a common root key used by at least one other device to which this device is paired;
an index source comprising a clock source for use by the hash engine; and
a logical interconnection between the private key generator, the non-volatile memory and the hash engine;
said hash engine performing a number of hashes on the private key to generate an identifying value based on the private key and the common root key, wherein the number of hashes is based on the difference between an clock number which is one of a series of decreasing numbers indicated by the index source and a reference time stored in the non-volatile memory;
said identifying value provided via the logical interconnection for use in authenticating said device with the other device and wherein the common root key is used to cryptographically communicate with the other device.

19. The device of claim 18 wherein the clock number comprises a current timestamp, wherein the reference time comprises an end timestamp and wherein the number of hashes is derived from the difference between the current timestamp and an end timestamp.

20. A system for cryptographic communication, comprising:
a plurality of devices, wherein each device comprises:
   a private key generator for generating a private key;
   a non-volatile memory for storing at least the private key;
   a hash engine using a common root key and the private key;
   an index source comprising a clock source for use by the hash engine; and
   a logical interconnection between the private key generator, the non-volatile memory, and the hash engine;
wherein each of the devices shares the common root key which is generated by connecting the devices together; and
wherein each of the hash engines of each of the devices is configured to use the common root key to cryptographically communicate with other devices of the plurality of devices;
wherein each hash engine performs a number of hashes on the private key to generate an identifying value based on the private key and the common root key;

wherein the number of hashes is based on the difference between an clock number indicated by the index source and a reference time stored in the non-volatile memory; and wherein the generated identifying value provided via the logical interconnection is for use in authenticating said device.

21. The system of claim 20 wherein the clock number comprises a current timestamp, wherein the reference time comprises an end timestamp and wherein the number of hashes is derived from the difference between the current timestamp and an end timestamp.

\* \* \* \* \*